UNITED STATES PATENT OFFICE.

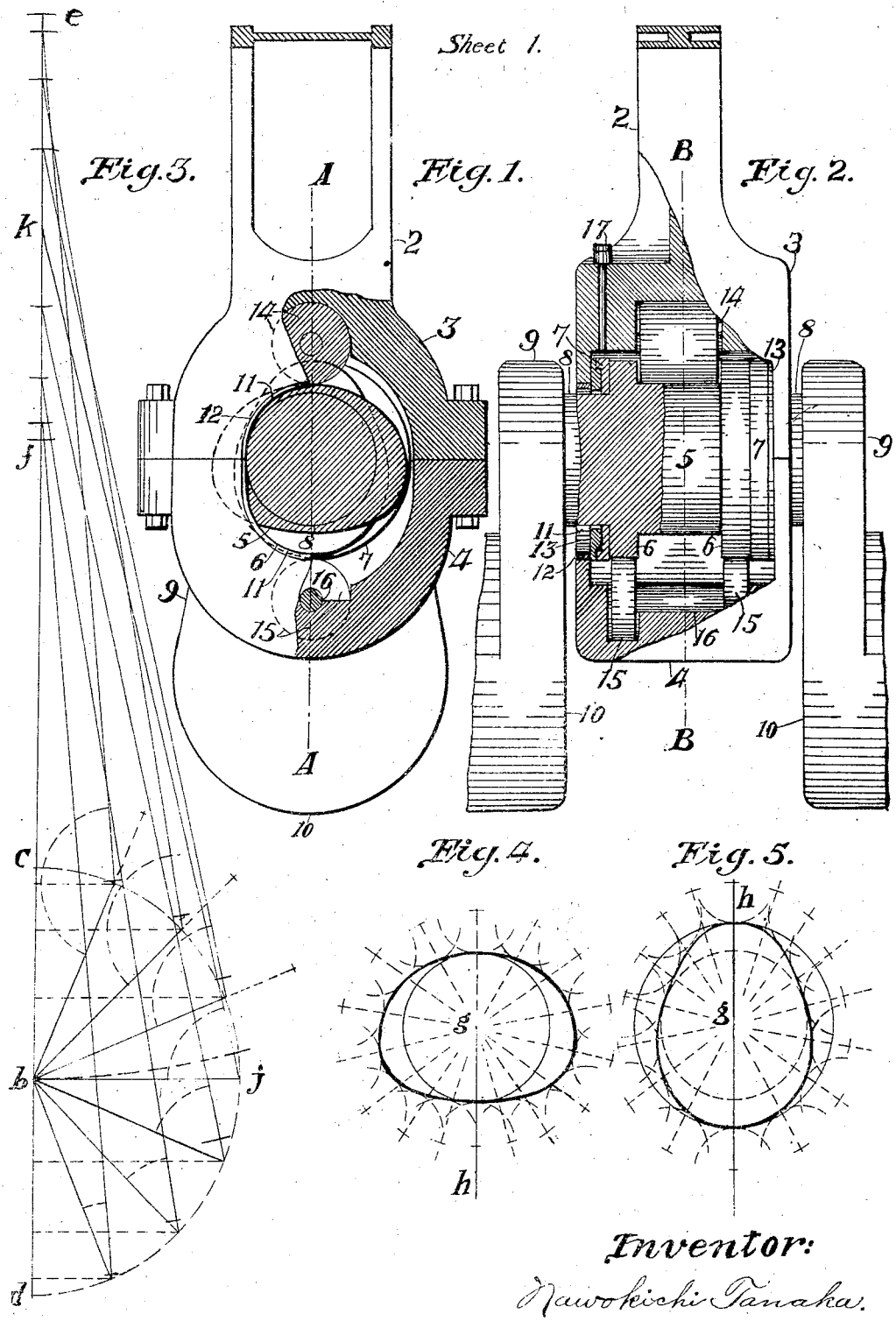

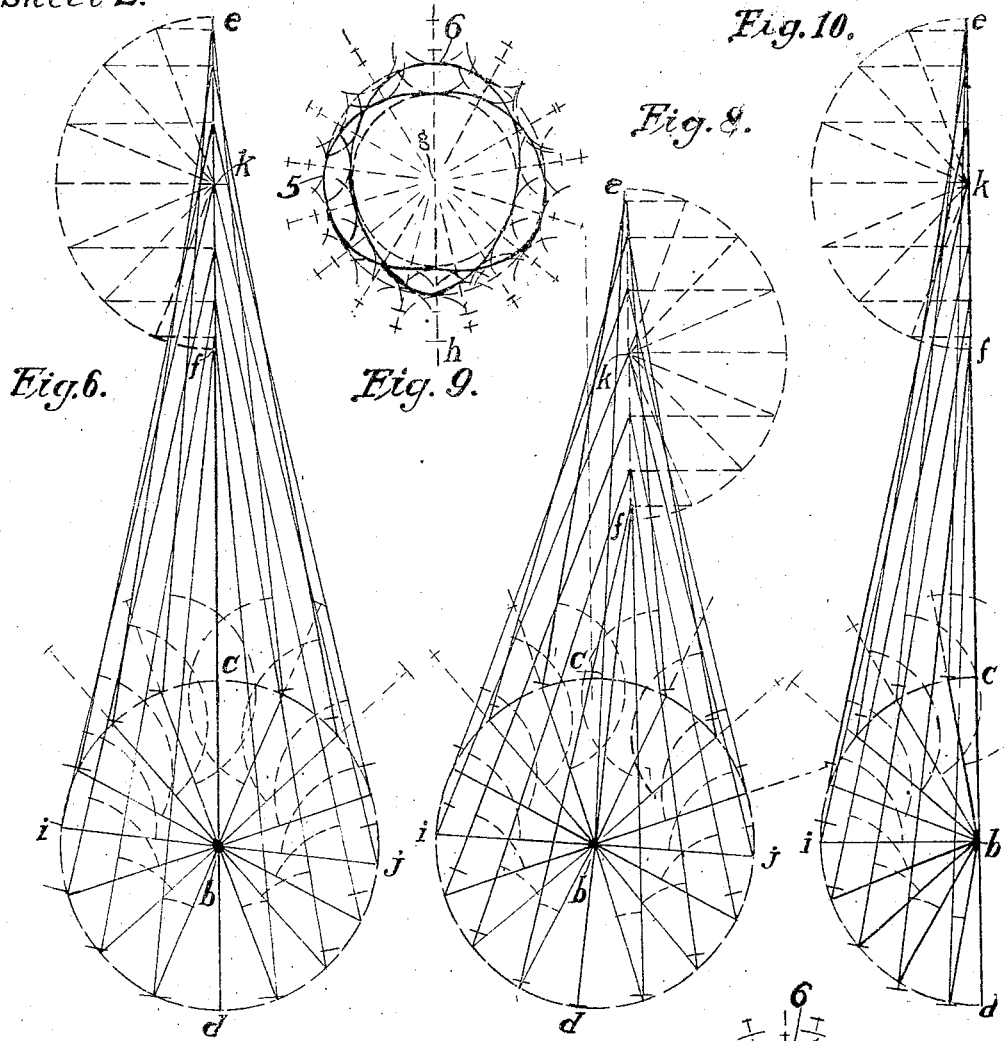

NAWOKICHI TANAKA, OF BOSTON, MASSACHUSETTS.

CRANK-PISTON CONNECTOR.

1,309,917.　　　　　Specification of Letters Patent.　　Patented July 15, 1919.

Application filed March 14, 1919. Serial No. 282,713.

*To all whom it may concern:*

Be it known that I, NAWOKICHI TANAKA, a subject of the Emperor of Japan, residing at Boston, in the county of Suffolk and Commonwealth of Massachusetts, have invented a new and useful Crank-Piston Connector, of which the following is a specification.

This invention relates to a crank-piston connector of variable connection length, in which a connecting rod has a housing or bearing for cams, and said cams having specifically prepared profiles are mounted on or form an integral part of a crank-pin, and, rotating as the crank turns, are adapted to move said housing reciprocally relatively to the cam axis, in response to change of the inclination of the connector to the crank-throw carrying said crank-pin, and the variation of the connection length is thereby caused to effect an advantageous piston movement with respect to the uniform revolution of the crank shaft.

With connecting means of ordinary construction, the piston movement differs in the opposite strokes, as the crank-shaft uniformly rotates, and it appears to be impossible to obtain the initial slow movement of pistons desirable, if not requisite, for a high speed engine, and furthermore, the desired slowing-down or speeding-up of piston movement at certain stage of a stroke for utilizing the expansion energy more efficiently is, if possible, a difficult matter to attain. The present invention mainly aims to provide simple means for joining a connecting rod to a crank-throw, whereby the engine efficiency is improved on these points, or in other words, my invention has for its object, first, to reduce power waste in engine cylinders or otherwise improve engine efficiency; second, to provide a simple and efficient connector for a piston and crank whereby their relative movement is modified; third, to reduce or eliminate the torsional vibration due to the difference of opposite piston strokes.

Further objects of the invention are the provision of cams which act correlatively on opposite sides, responding to the change of the inclination of a connector to its crank-throw; the employment of cams, acting with their shaft or circular members mounted therewith, capable positively to impart reciprocating movement to the housing thereof; and the provision of an oil-containing housing therefor.

With the above and other objects in view, my invention comprises certain detail of construction and arrangement of parts as will be hereinafter more fully described, illustrated and claimed.

The invention will be best understood by referring to the accompanying drawings which form a part of this specification, and in which—

Figure 1 is a part sectional view of a crank-piston connector, in connection with crank part, embodying my invention;

Fig. 2 is a side view of the same, the part section therein being taken along line A—A of Fig. 1, and line B—B showing where the part section of Fig. 1 is traced;

Figs. 3, 4, and 5 show how I obtain the cam forms appearing in Fig. 1;

Figs. 6 and 7 depict a geometrical way to determine cam profiles suitable for high and low speed engines;

Figs. 8 and 9 illustrate how the cam profiles may be modified when used for an offset engine; and Figs. 10 and 11 set forth a way how to draw the cam profiles with purpose to obtain certain piston recesses for an engine.

Similar numerals and characters indicate corresponding parts throughout several views.

Referring to Figs. 1 and 2, 2 designates a rod whose upper portion is omitted but is understood to be connected with a piston in one of the known manners. The lower part of the rod forms a cam housing 3—4. These parts are preferably cast or forged in two pieces, and the lower half 4 is bolted to the upper half 3 of the housing which is integral with the rod portion as shown.

Within the housing 3—4, there is located a crank-pin which comprises a main cam 5, auxiliary cams 6, 6, and circular plates 7, 7, all rigid with their shaft 8. This crank-pin is in rigid connection with crank-webs 9, 9 a crank or crank throw) and crankshaft 10, and may be cast or forged together therewith, the cam part being properly machined thereon or otherwise secured therewith.

The housing has two somewhat elliptical openings 11, 11 admitting the cam shaft 8 to pass through and to allow certain relative reciprocating movement thereof as later will be referred to. These openings are provided with bushings 12, 12 of white metal or comparatively soft metal on which the cam shaft is to slide.

To make the cam housing a lubricant container, these openings 11, 11 are substantially closed by the circular plates 7, 7 which have retaining edges or bosses holding in the place white metal washer rings 13, 13 against the housing wall. The washer rings are made in halves, if the whole crank shaft is made in one piece, and may be held rigid with the plates or rotatably in the bosses. Simplicity and durability in view, I prefer the above construction; however, the circular plates 7, 7 may be rotatably mounted on the cam shaft, when desired, with washers against the cams 6, 6. Furthermore, the circumference of the plates may be made large enough to reach the side wall of the housing so as to share with the cam shaft the burden imposed by the lateral thrust of the housing.

In engagement with the main cam 5, an anti-friction roller 14 with its shaft is held in its bed on the upper inside wall of the housing, while the lower wall is provided with beds for other rollers 15, 15 which are adapted to engage with the auxiliary cams 6, 6 and are joined by a shaft 16. As will be depicted later, these rollers are adapted to roll in their beds, for the profiles of the cams are such as to keep them substantially at a constant distance. The sidewise movement of the rollers is resisted by the bed walls which are in contact with the ends of the rollers. As these rollers are removable, when a renewal is required they may be made of softer metal than the cam profiles though not necessarily since they can be kept in an oil bath. The use of the two auxiliary cams is apparently for obtaining a symmetrical balance, and the number of these two kinds of cams and the arrangement thereof may be otherwise, if desired. As the auxiliary cams 6, 6 operate under less stresses than the main cam 5, they are made to have less contact surface to save space for the latter. 17 indicates an oil cock.

I have shown herein anti-friction rollers as the cam followers; however, should simplicity and lightness be more important, the lower rollers may be substituted by an equivalent convex surface of the housing wall, and even the upper roller may be dispensed with by similar substitution.

In Figs. 3, 4, and 5, a geometrical way to determine cam profiles for a high speed engine and for a symmetrical piston movement is depicted. The cam profiles are so related to each other, as to keep continuous substantial contact on opposite sides with the contact surfaces of the bearing, or with the rollers as in this case.

Referring to Fig. 3, the broken semicircle indicates part orbit of a crank-pin around the crank axis $b$, and is cut by a number of radii (there are only seven shown for the sake of clearness) which divide the semi-circle equally, but which may be taken at random greater the number being better for accuracy. The broken horizontal lines are sine lines to the vertical diameter $c-d$. This diameter being equal to the piston pass $e-f$ the intersections are transcribed onto the latter. Each of these points on the piston pass $e-f$ is connected with the corresponding point on the semi-circle, representing the position of the connector. Subtracting the connection length $e-c$ at the top center from every other, an increment of length required at each stage of the connector movement is found for a symmetrical piston movement. This data and the angles or inclination between the connector and the crank-throw represented by the radii are the needed data for forming the cam profiles.

Transplanting these angles on the left-hand side of the vertical line $g-h$ of Fig. 4, measuring therefrom with $g$ as the center of radiation, a series of radial lines are obtained. In this case, the connector position on the left half of the crank-pin orbit is symmetrical to that on the other half, so the angles are copied symmetrically on the right-hand side of the line $g-h$. $g$ as the center, a circle of suitable radius is circumscribed, cutting the above radial lines. Outwardly from these intersections, I find a point on each line at a distance, equal to the sum of the radius of a roller (which is to be employed as the cam follower) and the increment (algebraically, if it is decrement) of connection length at that stage. With these points as the centers and with the radius of the roller, a series of arcs are drawn inwardly, representing the position of the cam follower at each stage of the crank movement. A closed curve made tangentially to these arcs represents the main cam profile.

In Fig. 5, the radial lines obtained as above are turned 180 degrees, and a solid circle is circumscribed whose radius, though may have any suitable length, is made greater than that of Fig. 4 by the increment of connection length at the mid-stroke of the piston in order to have cams of same size. From the points where this circle cut the radial lines, the centers of arcs are found at a distance outwardly equal to the radius of a roller minus the increment (algebraically, if it is decrement) of connection length at the corresponding stage. In the drawings, the diameters of the two rollers are taken equal, but they may be different when desired. As before, arcs and a closed curve tangentially to the arcs are drawn. This closed curve represents the auxiliary cam profile.

As it is readily understood, when the two curves set one over the other, with $g$ as their common center and with the direction as it appears in the drawings, every two corresponding radial lines onto which equal increment was carried oppositely are on opposite sides, and consequently, when two cams having such curved profiles are mounted on a common shaft, and two rollers having the given radii as above are made to roll on the cams on exact opposite sides, one roller in contact with one cam only, as seen in Fig. 1, the distance between the rollers is constant and the rollers follow the cam profiles in harmony. However, in applying to practical use, certain due allowance for thermal expansion and for oil passage is to be made by using a slightly larger radius for the arcs in determining the cam form.

The cams thus determined, when forged or machined on a crank pin, have the lower side of the cam forms toward the crank-shaft axis (see Fig. 1).

If simplicity is preferable to the oil-tight provision, the circular plates 7, 7 and the rings 13, 13 may be dispensed with, substituting simple washers in lieu.

Although I have herein shown cam followers with convex surface as preferred, they may have flat surface or even concave, with corresponding change in cam profiles.

In operation, a piston in connection with this device, after leaving its upper center in an expansion stroke, weighs upon the main cam 5 through the upper roller 14, thereby turning the crank-throw downward, and the crank-turn means the rotation of the cams in the same direction. Since the rod 2 is pivotally held by the piston, it does not turn with the cams, but the rollers roll on respective cam profiles, the upper roller 14 up a slight gradual inclination on the main cam 5, and the lower rollers 15, 15 toward the cam axis in contact with the auxiliary cams 6, 6, during the first 90 degrees of the crank rotation. Assuming the crank turns clockwise, this action of the roller 14 exerts side pressure on the left side of the cam shaft (and that of the circular plates 7, 7, if the plates have their circumferences in contact with the housing wall), and works oppositely to the side thrust of the piston to its cylinder. This movement of the rollers gradually shifts the housing 3—4 upward relatively to the axis of the cam-shaft, thereby increasing the connection length between the piston and the crank-pin axis, while the rollers maintain a constant distance therebetween, is explained referring to Figs. 4 and 5, substantially in continuous contact with respective cams.

When the roller 14 reaches the left apex of the main cam 5 after 90 degrees of crank rotation, the piston is found at the middle of the stroke (in the present case). During the other half of the stroke, the roller 14 gradually falls back toward and the rollers 15, 15 are driven away from the cam axle, allowing the housing to move downward, relatively to the cam shaft, and therefore reducing the connection length, until the lower center is reached, when the connection length is the same as at the upper center and when the rollers 15, 15 confront the narrower ends of the cams 6, 6. This completes a cycle of reciprocatory movement of the housing with respect to the cam shaft. In intake strokes of piston (when used in a four cycle engine), the performance is the same as above, except the active agents for transmitting power are the cams 6, 6 and the rollers 15, 15, as the crank leads the piston.

In return strokes (compression and exhaustion strokes), the turning of the cams acts upon the housing in similar manner, forcing the housing upward and then downward with respect to the cam shaft, or increasing and then decreasing connection length through the upper roller 14 which rides on the other apex of cam 5, when the piston is at its mid-stroke, or at 90 degrees of the crank rotation from either center. At the upper dead center, the cams and hence the housing resume the initial position, thus the housing completing another cycle of reciprocatory motion.

The foregoing explanation is easily understood by considering the form of the cams in respect to the rollers and the relation thereof to the crank and the rod, as already described.

It is readily apparent from the above description, that by properly modifying the cam profiles, the relative position of the piston and the crank-pin at any stage of stroke can be changed as desired within a practical limit, by changing the position of the crank-pin with respect to corresponding position of the piston in determining cam profiles. As for example, some of the other cam forms are depicted in Figs. 6 to 11 inclusive. However, these are fundamental forms for obtaining the similar movement of a piston in opposite strokes, and, as is understood from the illustration herein, the distance between points on the piston pass shows comparative speed at that part of piston stroke, when the crank shaft is rotating uniformly. Therefore it requires no explanation in stating that by shifting the position of these points one way or other or by modifying the distance therebetween in forming cam profiles, piston speed at a given stage of a stroke may also be augmented or diminished.

If the connection length between the piston and crank-pin be invariable as in the case with a customary connecting rod, the movement of piston is different in opposite strokes with the uniform rotation of the crank-shaft, the piston traveling faster during the upper 180 degrees of crank rotation than during the lower 180 degrees, and when the crank-pin is at the midway between the dead centers, the piston can not be at the middle of its pass, unless the connecting rod has infinite length, but will be at a position nearer to the bottom center.

With the present provision, the relative movement of the piston and crank-pin is so modified that their vertical rectilinear motion is made equal (with the cams depicted in Figs. 4 and 5). It follows that the piston is made to travel slower than with a usual connecting rod during the upper half of crank rotation, and the acceleration of piston speed at the upper half of power strokes is made smaller so as to meet with the requirement in high speed engines.

In Figs. 6 and 7, cam profile forming is shown for still higher or lower speed engines. In order to obtain low initial speed for a high speed engine, or high beginning speed for a low speed engine, and, at the same time, to secure similar opposite strokes of a piston, the position of the crank-throw at the mid-stroke of the piston is somewhat changed as seen in Fig. 6, the depiction in regard to Fig. 3 being taken as a reference. Diameter $e$—$f$ denotes the piston pass, and the lower broken circle represents the crank-pin pass which is divided into four parts by the vertical line $c$—$d$ and a diameter $i$—$j$, lines $k$—$i$ and $k$—$j$ being the two positions of the connector when the piston is at its mid-stroke. Each part is divided equally into equal number (for convenience), and each half of the broken semi-circle which has piston pass $e$—$f$ as a diameter is also equally divided into the same number as above. Radii from crank shaft center $b$ to the division points on circle $c\ i\ d\ j$ are drawn to represent the position of the crank-throw at several stages of crank rotation. Horizontal lines perpendicular to piston pass $e$—$f$ from the dividing points on semi-circle $e$—$f$ are made, and the points of intersection thus obtained on piston pass $e$—$f$ are connected with the corresponding division points on the circle, in the order up to down on either side, indicating the position of the connecting rod at several stages of crank rotation. From the connection length of the rod thus obtained, length $e$—$c$ at the top center is subtracted to find the necessary increment (or decrement, if negative) of connection length at each stage. In Fig. 6, $k$—$i$ is made nearly equal to $e$—$c$, so that at the left hand side, the connection length remains almost the same (note the circular curves at the right side of Fig. 7).

From the data obtained in Fig. 6, main and auxiliary cam profiles, 5 and 6 respectively, are drawn in Fig. 7 in similar manner as in Figs. 4 and 5, but in this case, the angles between the crank-throw and the connector are not symmetrical on both sides of the vertical diameter $c$—$d$ of Fig. 6, so that the left side angles in Fig. 6 are transferred on the right side of the line $g$—$h$ of Fig. 7, separately from the right side angles which are transferred to the left side of the vertical line $g$—$h$, and the two complementary cam forms are drawn as in Figs. 4 and 5 one over the other for the sake of simplicity, the inner broken circle corresponding to the circle of Fig. 4 and the outer broken circle to the solid circle of Fig. 5 in finding the centers of arcs. In applying to a crank-pin, the lower side of the main cam profile 5 and the upper side of the auxiliary cam profile 6 are to be set toward the crank shaft. Mounting the cams as thus, if the crank turns clock-wise, these cams are for a high speed engine, but if counter clock-wise, they are for a slow engine.

In Figs. 8 and 9, there is illustrated a way to determine cam profiles for an offset engine, the similarity of the opposite strokes being maintained. The process of the profile forming is briefly as follows: The points on piston pass $e$—$f$ are found as in Fig. 6. Point $c$ is the intersection between crank-pin orbit $c\ j\ d\ i$ and straight line $e\ c\ b$ which represents the position of the connector and the crank-throw at the upper dead center. Straight lines $f\ d$ and $b\ d$ designate the position of the connector and crank-throw at the bottom center. The diameter $i\ b\ j$ is the base of isosceles triangle $k\ i\ j$ where $k$ denotes the middle point of the piston pass. The four portions of the circle divided by $c, i\ d$ and $j$ are again divided equally into the same number as before, and these division points are joined with the corresponding points on the piston pass as shown. The inclination angles and the required increment are obtained, following to the manner described for Fig. 6, and cam curves are determined from these data, as in Figs. 4, 5 and 7.

In Figs. 10 and 11, cam profiles are presented, intended to give the piston a long recess at each dead center, being a modification wherein a change is incorporated with the cam forms shown in Figs. 4 and 5. This feature may be applied to any other cam forms for the present purpose. In the figures, the period of each recess is taken at about 20 degrees of the angular movement of the crank.

The advantages for having the piston recesses are understood by considering the modern gas engines in which a lead or lag is given to the opening and closing of their valves; notably, the exhaustion valves may be opened in advance with very much less or no sacrifice of the power strokes, thereby more energy of explosion can be utilized, and the exhaustion is made more complete, as the piston reaches the top center long before the valve closes; the full charge of fuel can be taken in before the piston starts in its upward travel; and the compression of gas can be made perfect before the upper center is reached, so that better ignition is effected when the time of ignition is advanced, particularly in high speed engines.

Referring to Fig. 10, the points on piston pass $e$—$f$ are found as in Fig. 6, and lower semi-circle $c \, i \, d$ which indicates the left side half of a crank-pin pass is divided as follows: At the top and bottom, suitable angles $c \, b \, c^1$ and $d \, b \, d^1$ are taken for one half period of the intended piston recesses at respective dead centers. Lines $e \, c^1$ and $f \, d^1$ represent the position of the connector at either end of the piston recesses respectively at the top and bottom centers, while line $k$—$i$ indicates the position of the connector at the mid-stroke of the piston. Arc $c^1 \, i \, d^1$ is equally divided into as many portions as the upper semi-circle is, and the division points are connected with corresponding points on piston pass $e$—$f$ to designate the position of the connector at respective stages of piston movement. The angles between the connector and crank-throw, which is represented by the radii as before, at respective stages are copied on both sides of $g$—$h$ of Fig. 11 as in Fig. 4. The required increments or decrements of connection length to obtain the piston recesses are then obtained by algebraically subtracting length $e$—$c$ from each connection length. If a connection length is smaller than $e$—$c$, the difference is a decrement which is taken as a negative quantity in following the process of cam form making. The connector movement in this case being symmetrical, the data obtained in Fig. 10 are symmetrically carried to Fig. 11. Following to the way of cam profile forming depicted referring to Figs. 4, 5 and 7, two closed curves are drawn one over the other. In mounting on a crank-pin, the direction is the same as those in Fig. 7.

From the foregoing description taken in connection with the accompanying drawings, the advantage of the construction and arrangement of parts and the method of operation will be readily apparent to those skilled in the art to which this invention appertains, and while I have herein set forth the invention in what is now thought to be the best embodiment of my invention, I wish to have it understood that the apparatus herein shown and described is merely illustrative, and that therefore I do not confine myself to any strict conformity to the showing of the drawings, but such changes or modifications may be made, when desired, as to fall within the scope of the invention as claimed.

Having thus described my invention, what I claim as new is:—

1. A connecting medium of variable connection length for a crank and a reciprocating member, comprising a rod and a cam mechanism adapted to operate between said rod and said crank, in response to angular variation of the relative inclination between the rod and said crank, as herein substantially described.

2. Means of modifying the relative movement of a piston and a crank-pin, comprising a connecting rod having a cam housing as an integral part thereof, two kinds of cams mounted on said crank-pin, and cam followers on opposite sides of said cams, said cams being adapted to act or react correlatively upon said housing through said cam followers, rotating as the crank turns, and keeping continuous contact with said cam followers, thereby positively to vary the connecting length of said rod in response to change of the inclination of said rod to the crank-throw carrying said pin.

3. A connecting medium between a connecting rod and a crank-shaft, comprising a cam mechanism operated by relative angular change between said rod and a throw of said crank-shaft, as the latter rotates, so as to vary the connection length of said rod with respect to the position of said throw.

4. A connector for a crank-shaft and a piston, comprising two kinds of cams secured with a throw of said crank-shaft, and a rod having a cam housing which carries cam followers on opposite sides of said cams in substantial continuous contact therewith, the profiles of said cams being related to each other and to said cam followers, so as to keep the distance between said followers substantially constant, and to positively vary the connection length of said rod, as said crank-shaft rotates.

5. The combination with a crank; of a rod having a cam bearing, and a crank-pin, comprising main and auxiliary cams which are adapted to act or react correlatively on opposite sides upon said bearing, so as to vary the connection length of said rod, when said crank turns, the shaft of said cams being slidable only in the direction of the rod length in contact with said bearing.

6. The combination with a crank shaft; of a crank-pin, having circular and cam portions, and a connecting rod having a bearing therefor, the profiles of said cam portions being such as to reciprocally move said rod, relatively to the axis of said pin, with the circular portions resisting the lateral motion of said bearing, in response to change of the inclination of said connecting rod to the crank-throw carrying said crank-pin.

7. Means of attaching a connecting rod to a crank, comprising a shaft carrying cams, and a cam bearing, integral with said rod, having anti-friction rollers on opposite sides of said cams, the profiles of said cams being related to one another and to the rollers, so as to move the bearing reciprocally with respect to said shaft in response to the angular change of position of the crank carrying said shaft with respect to said rod, keeping the distance between said rollers substantially constant.

8. A crank-piston connector of variable connection length, comprising a crank-pin having cams and plates, a rod having a housing as an integral part thereof, and cam followers held in said housing continuously engaging with said cams on opposite sides of the latter, said housing having openings to admit said crank-pin to reciprocally move therein, and said plates having washers held thereby and adapted to slide in contact with the wall of said housing so as to keep said openings substantially closed.

9. The combination with a crank shaft; of a crank-pin rigid therewith having two kinds of cams, and a cam housing having cam followers on opposite sides of said crank-pin in engagement with respective cams, said cams being adapted to act or react upon the housing in response to angular change of position between said housing and a crank of said crank shaft.

10. A cam mechanism, comprising a cam shaft, having two kinds of double apex cams, and a housing therefor having cam followers on opposite sides of the cams, said cams having predetermined profiles to act correlatively on opposite sides, varying with the rotation thereof the elevation of said followers oppositely from the axis of said shaft, so that the distance between said followers is kept constant.

In testimony whereof I affix my signature in the presence of two subscribing witnesses.

NAWOKICHI TANAKA.

Witnesses:
 LOUELLA D. EVERETT,
 VIRGIL A. CHARLES.